C. E. CURTISS.
TILLAGE BLADE.
APPLICATION FILED FEB. 10, 1919.
1,336,821. Patented Apr. 13, 1920.
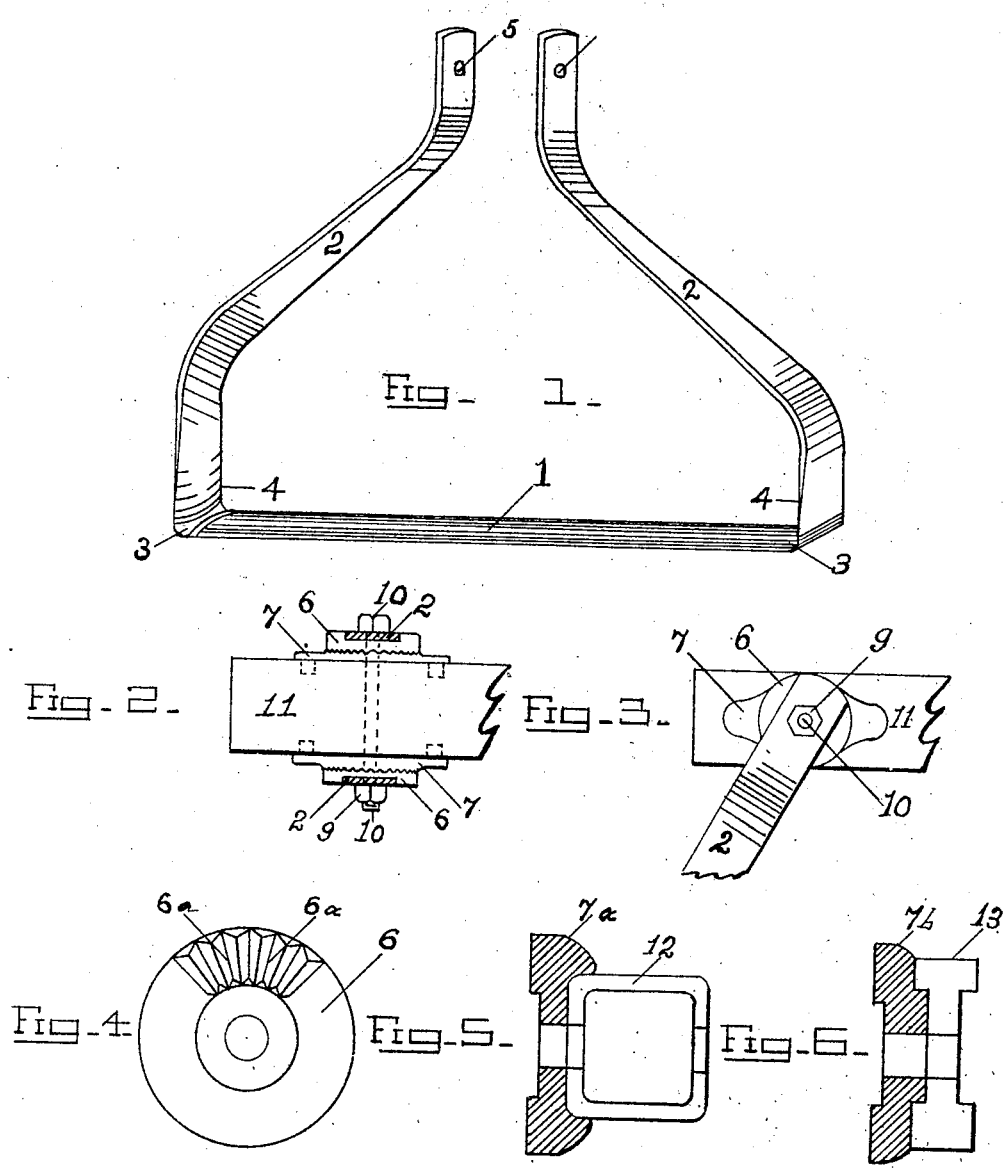
INVENTOR
Charles E. Curtiss

UNITED STATES PATENT OFFICE.

CHARLES E. CURTISS, OF CLINTON, WISCONSIN.

TILLAGE-BLADE.

1,336,821.

Specification of Letters Patent.

Patented Apr. 13, 1920.

Application filed February 10, 1919. Serial No. 276,171.

*To all whom it may concern:*

Be it known that I, CHARLES E. CURTISS, a citizen of the United States, residing at Clinton, in the county of Rock and State of Wisconsin, have invented a new and useful Tillage-Blade, of which the following is a specification.

I hereby declare the following to be a full, clear and exact description of the invention, such as will enable others skilled in the art to which it appertains to make and use the same.

This invention has reference, particularly, to what is termed surface cultivation and is adapted to use throughout the entire cultivating season.

The first object of this invention is to secure a cultivating means which is under perfect control of the operator. By this is meant there is little or no tendency to dodge sidewise when meeting resistance. The blade is straight and, normally, when in operation, is perpendicular to the line of motion, hence no tendency to lateral movements.

The second object of this invention is to get the weeds and stir the ground very close to the plant just as soon as it appears. The varying angle of the blade, in the different position of adjustment, in relation to the surface of the ground allows a wide range in depth of tillage, which means that the smallest plants as well as the more mature may receive proper cultivation.

The third object of this invention is to secure a fine mulch of earth to retain moisture. Unlike a cultivator shovel or tooth, which at best moves only a portion of the soil passed over, this blade moves all of the soil, to a certain depth, over which it passes and leaves the surface of the ground in condition to resist evaporation and to retain moisture coming from below.

A fourth object in this invention is to secure a form of tillage blade which will not only be under perfect control as to lateral movements but also a form which, in operation, allows an unobstructed view of the row of young plants, also a form which affords a guide which determines the exact location of the working parts, and again a form that can be operated very close to the row when the plants are well matured without injury to their roots or overhanging foliage.

In describing the invention in detail reference will be had to the accompanying drawings, wherein like numerals designate like parts throughout the several views.

Figure 1 is a perspective view of the complete tillage blade.

Fig. 2 is a plan of the assembled parts.

Fig. 3 is an elevation of the same parts shown in Fig. 2.

Fig. 4 is a plan of the washer, showing some of the radial teeth or corrugations.

Fig. 5 is a section of seat, showing form to be used with square pipe.

Fig. 6 is a section of seat, showing form adapted to use with an I-beam.

The blade, and an extension at either end, consists of a single piece of metal, preferably spring steel throughout, this may be modified, however, by substituting a cheaper metal for the upper part of the extensions and joining by means of welding or otherwise.

The central portion, or the blade proper, may have either one or both edges sharpened, preferably the latter as this makes the blade reversible, hence gives double service before the necessity of resharpening.

In fabrication, the extensions are bent transversely of and on the same side of blade to form angles of approximately 90 degrees with the blade, the apices of these angles are curves of short radius shown at 3—3 Fig. 1. These curves, and the adjacent portion of the extensions are thinned or sharpened from the inner side for the purpose of entering the soil more readily and also to move the dirt slightly away from very young plants. The thinning of the extensions, as at 4—4 Fig. 1, may be dispensed with without interfering materially with the action of the tool in general, the especial value of thin edges being in the tillage of small plants.

The extensions 2—2 Fig. 1 are further bent toward each other at a comparatively short distance from the first angle; this results in giving an unobstructed view ahead, and the portion of the extension between the first and second bend forms a guide in locating the exact position of the working part when in operation.

The extensions 2—2 Fig. 1 finally receive a reverse bend near their extremities and terminate in a form adapted to be attached to an operating tool as shown at 5 Fig. 1.

It is desirable, in operating this tillage blade, to change the angle between the blade and ground surface to suit the variation in plant size and soil condition, hence an adjustable means for securing the tillage blade to an operating tool is important; for this reason a convenient method is shown and others will be described.

In Figs. 2 and 3 is shown a method of attaching this tillage blade to a wood beam and in Figs. 5 and 6 the same method suited to attachment to a square pipe and I-beam. I do not wish to confine myself to the method shown, to the exclusion of other means of attachment which may be used with some success.

11, Figs. 2 and 3 represents a wood beam, 7—7, a seat on either side of beam, said seat having lugs integral therewith, which enter shallow holes in the beam and prevent turning of the seat. The outer faces of the seat, 7—7, have radial teeth or corrugations. 6—6 are washers having radial teeth or corrugations corresponding to and co-acting with the outer surfaces of the seats in all positions of revolution and, shown more clearly at 6ª, Fig. 4, which view is somewhat fragmentary. The reverse side of washer, 6, has a slot across the face adapted to receive the terminals of the blade extensions, 2—2— Fig. 1. All the parts shown in Figs. 2 and 3 have an aperture through which a bolt, 10, is passed and all are secured together by means of a nut, 9, in any desired position of revolution about bolt 10 as a center.

It may here be stated that the blade as a unit may be constructed from any suitable material or of any desired dimensions without departing from the spirit of the invention.

While in the foregoing description of the principles of operation of this invention, various features of construction have been set forth, it is to be understood that certain minor features, combination and arrangement of parts may be altered to suit practical conditions, provided such alterations come within the scope of what is claimed.

What is claimed is:—

1. A tillage blade comprising a straight sharp blade having an extension at either end, each extension having two similar consecutive bends toward each other, transversely of, and on the same side of the blade, and one bend each in a reverse direction, resulting in a completed blade in which the longitudinal center lines of the extensions and of the blade all lie in the same plane, as shown and described.

2. A tillage blade comprising a straight sharp blade having an extension at either end, each extension having two similar consecutive bends toward each other transversely of, and on the same side of the blade, and one bend in each extension, toward its terminal, in a reverse direction, resulting in a completed blade, in which, the terminals of the extensions lie in planes perpendicular to the blade.

3. A tillage blade comprising a straight blade having two sharp edges, an extension at either end of said blade integral therewith, each of said extensions having two inside beveled edges, for a distance contiguous to the blade, said extensions bent transversely on the same side of said blade to form angles of approximately 90 degrees therewith, forming curves of short radius at the apices, said extensions being further bent, at a distance from the blade, toward each other, and finally, each of said extensions receiving a bend, near its terminal, in a reverse direction thus adapting the completed blade to attachment to an operating tool as shown and for the purpose specified.

In testimony whereof I hereunto affix my signature in the presence of two witnesses.

CHARLES E. CURTISS.

Witnesses:
F. W. HERRON,
MARY C. JENSEN.